(12) United States Patent  (10) Patent No.: US 8,988,804 B2
McLaurin  (45) Date of Patent: Mar. 24, 2015

(54) MAGNETIC INDEX MARK BIAS POINT OFFSET

(71) Applicant: Seagate Technology LLC, Cupertino, CA (US)

(72) Inventor: Stephen Keith McLaurin, Sunnyvale, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/055,802

(22) Filed: Oct. 16, 2013

(65) Prior Publication Data

US 2015/0015991 A1 Jan. 15, 2015

Related U.S. Application Data

(60) Provisional application No. 61/844,423, filed on Jul. 10, 2013.

(51) Int. Cl.
G11B 5/09 (2006.01)
G11B 5/596 (2006.01)

(52) U.S. Cl.
CPC ................................ *G11B 5/59627* (2013.01)
USPC .............................................. 360/48; 360/31

(58) Field of Classification Search
None
See application file for complete search history.

(56) References Cited

U.S. PATENT DOCUMENTS

| | | | | |
|---|---|---|---|---|
| 5,297,131 | A * | 3/1994 | Tanaka | 369/275.2 |
| 5,867,340 | A | 2/1999 | Morehouse et al. | |
| 6,128,153 | A * | 10/2000 | Hasegawa et al. | 360/77.08 |
| 7,333,287 | B2 * | 2/2008 | Hara | 360/77.02 |
| 2005/0057837 | A1 * | 3/2005 | Takamatsu et al. | 360/48 |
| 2010/0079888 | A1 * | 4/2010 | Lambert | 360/31 |

* cited by examiner

*Primary Examiner* — Paul Huber

(57) ABSTRACT

The embodiments disclose an orientation control bias point coupled to a magnetic index mark and having a bias point offset set at predetermined coordinates configured to substantially prevent concentricity run-out.

19 Claims, 9 Drawing Sheets

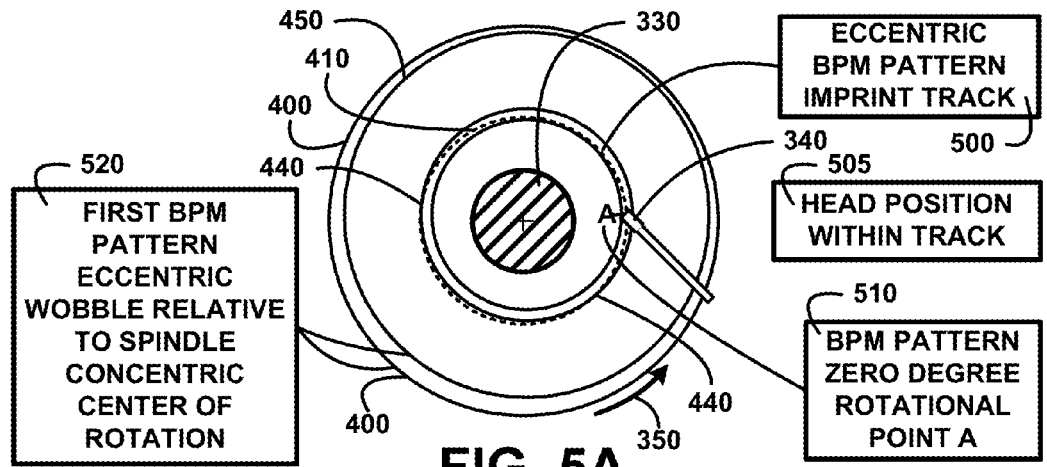
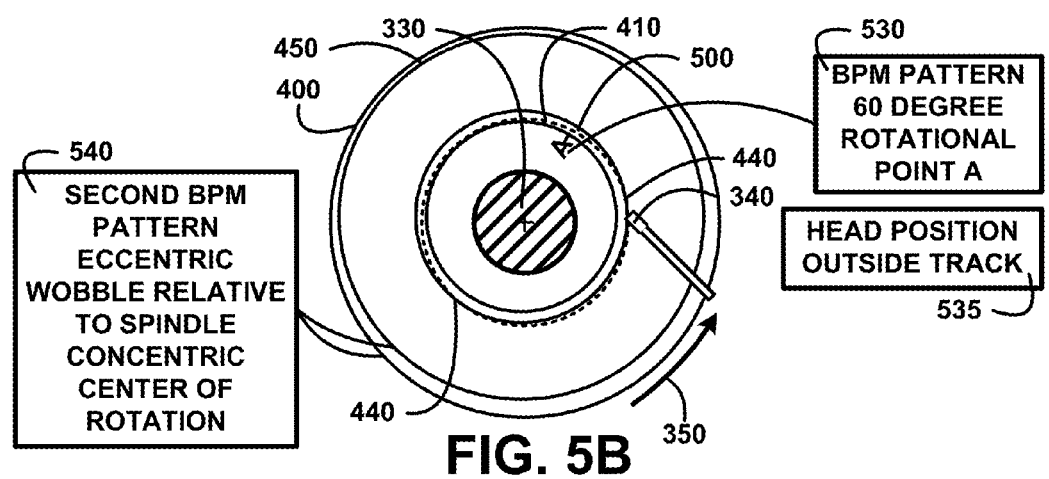
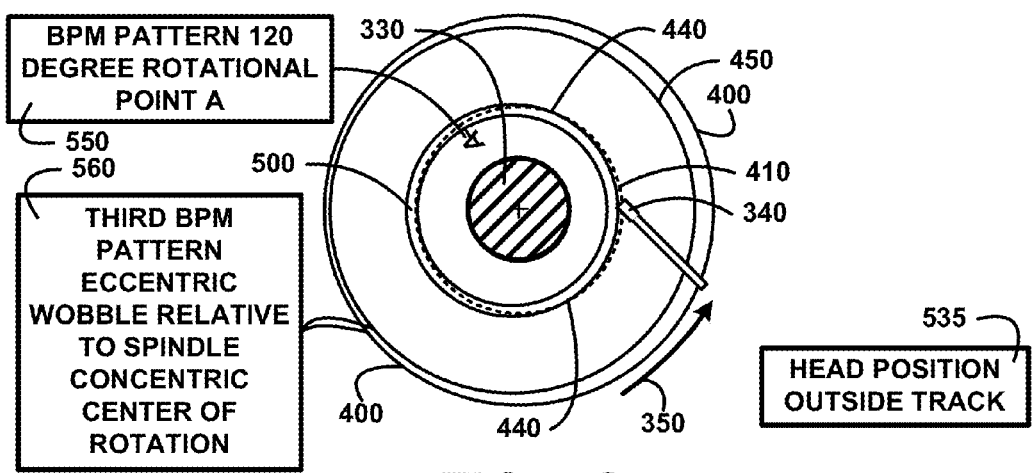

MAGNETIC INDEX MARK BIAS POINT OFFSET

CROSS-REFERENCE TO RELATED APPLICATIONS

This application claims the benefit of U.S. Provisional Patent Application Ser. No. 61/844,423 filed Jul. 10, 2013, entitled "A METHOD OF FABRICATING AN ORIENTATION CONTROL BIAS POINT IN A BPM PATTERN", by McLaurin, et al.

BRIEF DESCRIPTION OF THE DRAWINGS

FIG. 5A shows for illustrative purposes only an example of eccentric first wobble position of one embodiment.

FIG. 5B shows for illustrative purposes only an example of eccentric second wobble position of one embodiment.

FIG. 5C shows for illustrative purposes only an example of eccentric third wobble position of one embodiment.

DETAILED DESCRIPTION

In a following description, reference is made to the accompanying drawings, which form a part hereof, and in which is shown by way of illustration a specific example in which the embodiments may be practiced. It is to be understood that other embodiments may be utilized and structural changes may be made without departing from the scope.

General Overview

It should be noted that the descriptions that follow, for example, in terms of a method for fabricating an orientation control bias point is described for illustrative purposes and the underlying system can apply to any number and multiple types bit patterned media (BPM) stacks. In one embodiment, the method for fabricating an orientation control bias point can be configured using a bias point in a servo sector. The method for fabricating an orientation control bias point can be configured to include a magnetic index mark and can be configured to include an optical mark.

In BPM the center of rotation is determined by the pattern not the physical center of the spindle on which a stack disc is mounted. The physical disc when placed on the spindle establishes the physical center of rotation. However the concentric pattern imprinted on the disc may not be concentric with the physical center of rotation of the disc itself. This eccentricity can lead to run-out wherein the read-write head of the drive crosses over two or more tracks due to a wobbling effect of the eccentric mismatch of centers of rotation.

The method for fabricating an orientation control bias point places an index mark on the BPM template pattern used to indicate a center of rotation of the BPM pattern. This index mark is transferred to the stack disc when imprinted. The index mark creates a bias point offset from the physical center of rotation to a virtual center of rotation which the drive uses to shift the head to read and write within each track to prevent run-out. The BPM pattern imprint index mark establishes the shifting of head track position to accommodate the eccentric rotation thereby maintaining the head within a single track and eliminating run-out.

Figure 1:
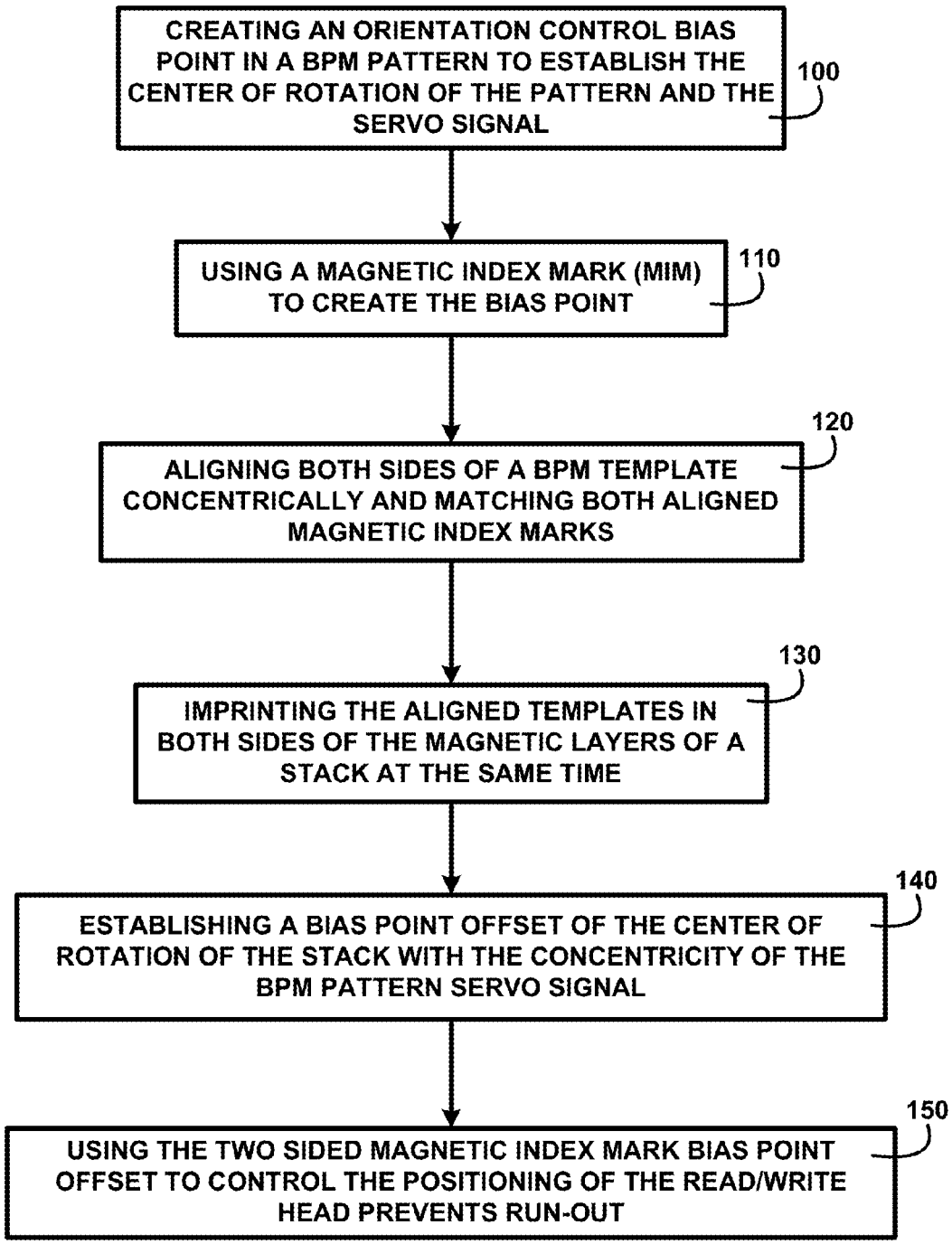
FIG. 1 shows a block diagram of an overview of a method for fabricating an orientation control bias point of one embodiment.

FIG. 1 shows a block diagram of an overview of a method for fabricating an orientation control bias point of one embodiment. FIG. 1 shows creating an orientation control bias point in a BPM pattern to establish the center of rotation of the pattern and the servo signal 100 of the BPM pattern. The fabrication process is using a magnetic index mark (MIM) to create the bias point 110. The process includes aligning both sides of a BPM template concentrically and matching both aligned magnetic index marks 120. Fabrication continues with imprinting the aligned templates in both sides of the magnetic layers of a stack at the same time 130 of one embodiment.

The imprinting the aligned templates in both sides of the magnetic layers of a stack at the same time 130 is used for establishing a bias point offset of the center of rotation of the stack with the concentricity of the BPM pattern servo signal 140. The bias point offset is used to create a virtual center of rotation of the BPM pattern. The disc drive apparatus uses the bias point offset to position the read-write head according to the virtual center of rotation of the BPM pattern. The read-write head positioning using the virtual center of rotation eliminates the wobbling effect otherwise encountered by the read-write head due to the eccentric mismatch of centers of rotation. The method for fabricating an orientation control bias point using the two sided magnetic index mark bias point offset to control the positioning of the read/write head prevents run-out 150 of one embodiment.

DETAILED DESCRIPTION

Figure 2:
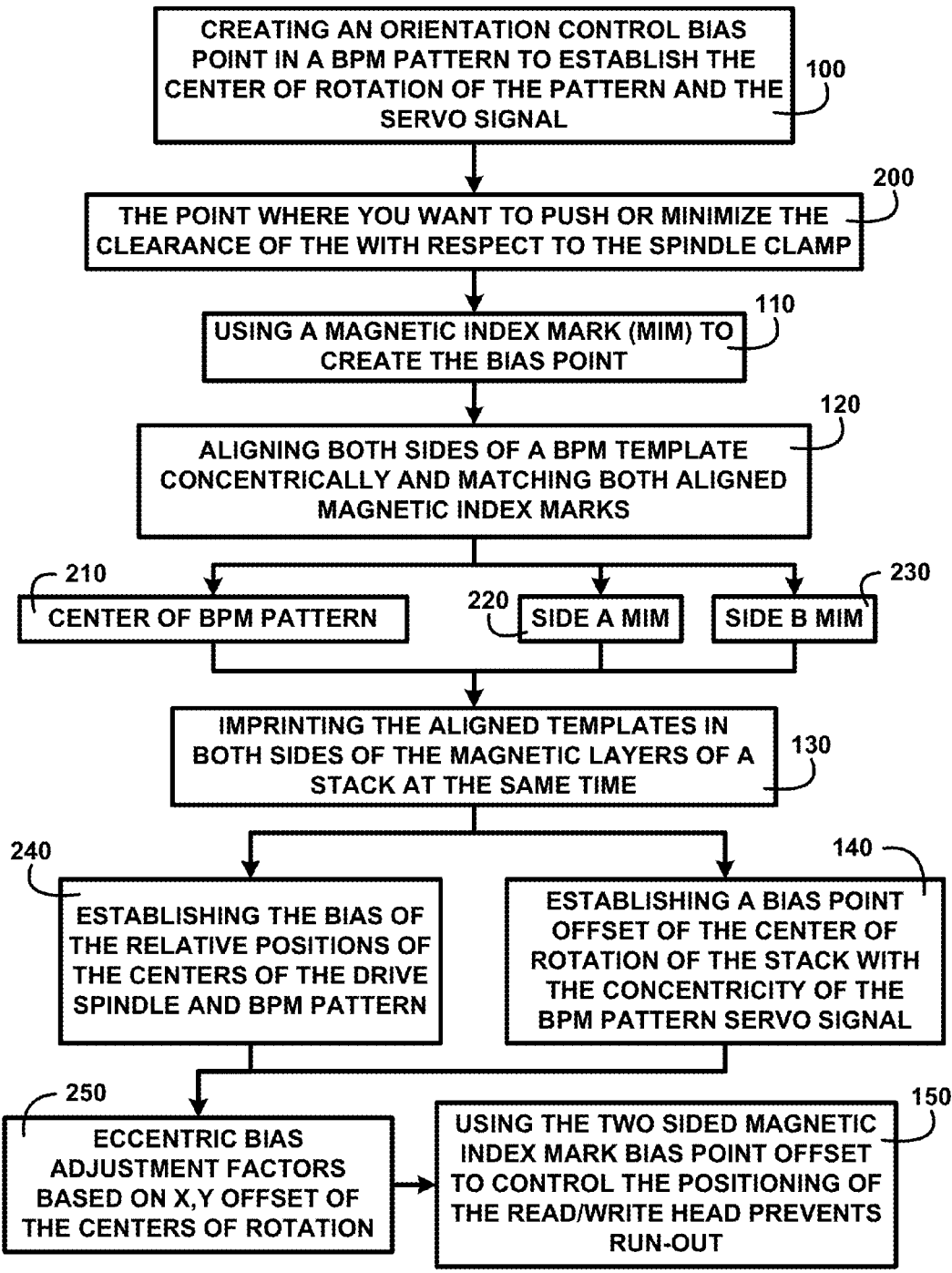
FIG. 2 shows a block diagram of an overview flow chart of a method for fabricating an orientation control bias point of one embodiment.

FIG. 2 shows a block diagram of an overview flow chart of a method for fabricating an orientation control bias point of one embodiment. FIG. 2 shows creating an orientation control bias point in a BPM pattern to establish the center of rotation of the pattern and the servo signal 100. The bias point is the point where you want to push or minimize the clearance of the with respect to the spindle clamp 200. The process creating an orientation control bias point in a BPM pattern to establish the center of rotation of the pattern and the servo signal 100 is using a magnetic index mark (MIM) to create the bias point 110. The MIM is integrated into the BPM pattern on the master imprint templates for both sides of a stack. An apparatus is used for aligning both sides of a BPM template concentrically and matching both aligned magnetic index marks 120 including a center of BPM pattern 210, side A MIM 220 and side B MIM 230. An apparatus is used for imprinting the aligned templates in both sides of the magnetic layers of a stack at the same time 130 of one embodiment.

The imprinting is made into the magnetic layers on both sides of the stack being fabricated. The magnetic index mark can be made close to the 0° zero point of the first sector. The MIM is larger than a degree of rotation and will be larger than any one sector. Establishing a bias point offset of the center of rotation of the stack with the concentricity of the BPM pattern servo signal 140 will enable control of the read-write head positioning to coincide with the concentricity of the BPM pattern and servo signal of one embodiment.

The bias point offset is for recording and establishing the bias of the relative positions of the centers of the drive spindle and BPM pattern 240. Establishing the bias of the relative positions of the centers of the drive spindle and BPM pattern 240 can be using eccentric bias adjustment factors based on x,y offsets of the centers of rotation 250. The bias adjustment factors can be used by an apparatus to control the positioning of the read-write head to maintain a position within the track being written to or read from. Imprints of the BPM pattern in a stack using the two sided magnetic index mark bias point offset to control the positioning of the read/write head prevents run-out of one embodiment.

Figure 3A:
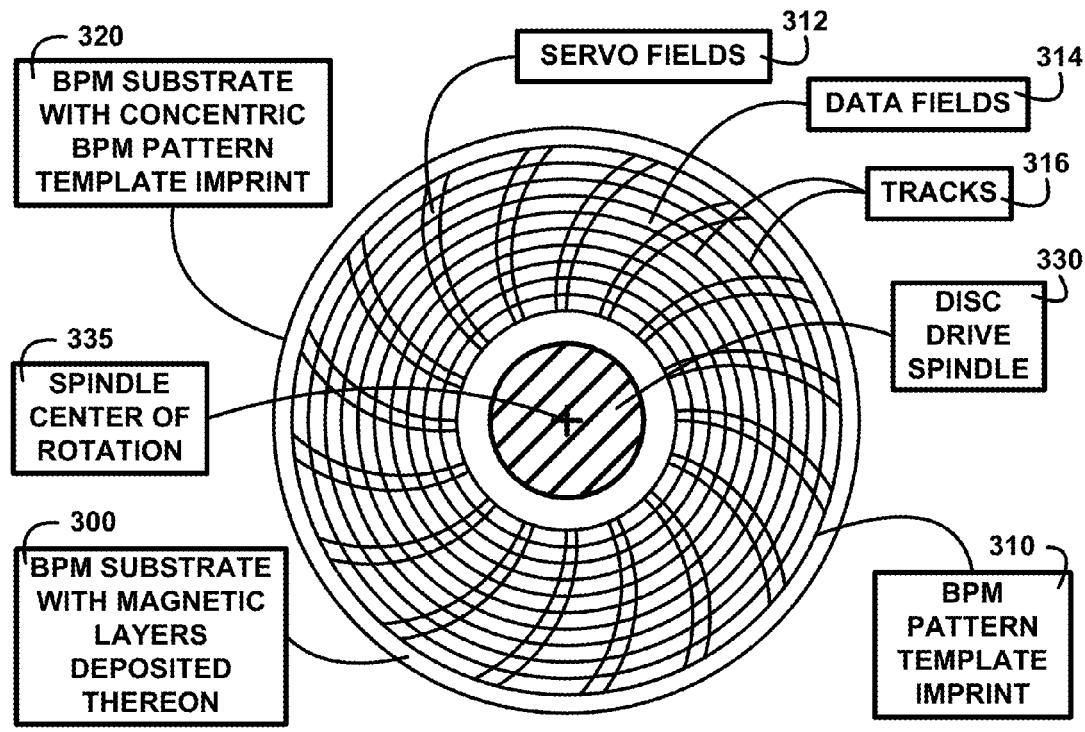
FIG. 3A shows for illustrative purposes only an example of a concentric BPM pattern imprint of one embodiment.

FIG. 3A shows for illustrative purposes only an example of concentric BPM pattern imprint of one embodiment. FIG. 3A shows a BPM substrate with magnetic layers deposited thereon 300. The magnetic layers are imprinted using one or more BPM pattern templates to transfer BPM pattern features into the magnetic materials. A BPM pattern template imprint 310 includes servo fields 312, data fields 314 and tracks 316. FIG. 3A shows a BPM substrate with concentric BPM pattern template imprint 320 features including tracks 316. The BPM substrate with concentric BPM pattern template imprint 320 features including tracks 316 is mounted on a disc drive spindle 330. The disc drive spindle 330 is used to rotate or spin the BPM substrate with concentric BPM pattern template imprint 320 about a spindle center of rotation 335 of one embodiment.

Figure 3B:
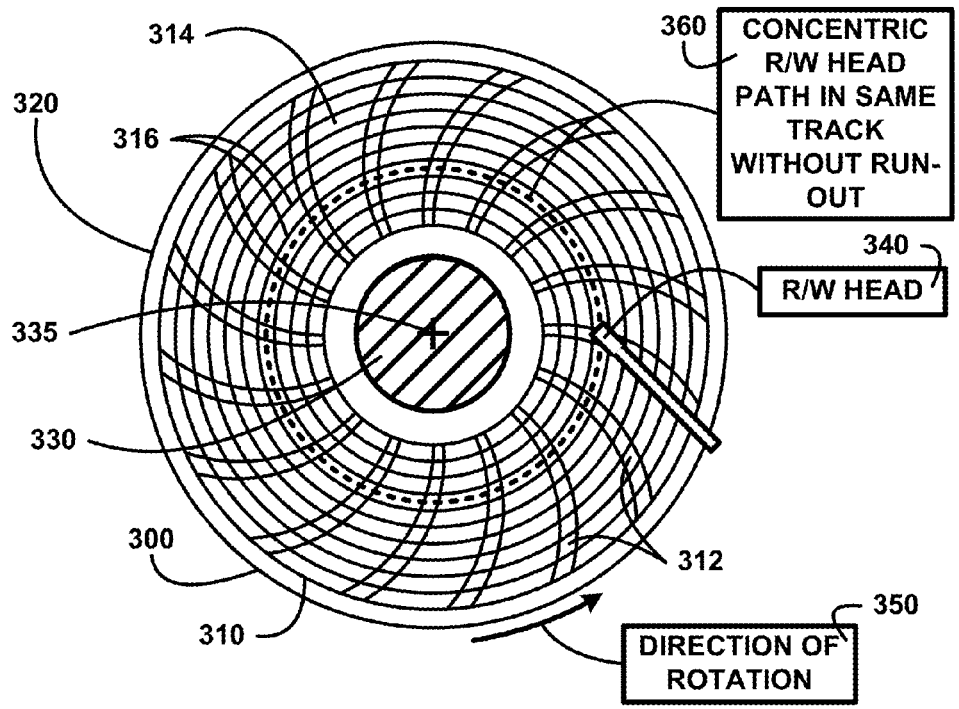
FIG. 3B shows for illustrative purposes only an example of a concentric r/w head path in same track without run-out of one embodiment.

FIG. 3B shows for illustrative purposes only an example of a concentric r/w head path in same track without run-out of one embodiment. FIG. 3B shows the BPM substrate with magnetic layers deposited thereon 300. The BPM pattern template imprint 310 includes the servo fields 312, data fields 314 and tracks 316. In this example the imprinting process creates the BPM substrate with concentric BPM pattern template imprint 320 which is concentric with the spindle center of rotation 335 of the disc drive spindle 330. The disc drive spindle 330 imparts a direction of rotation 350. Rotating about the spindle center of rotation 335 a r/w head 340 to be position so as to follow a concentric r/w head path in same track without run-out 360 of one embodiment.

Figure 4:
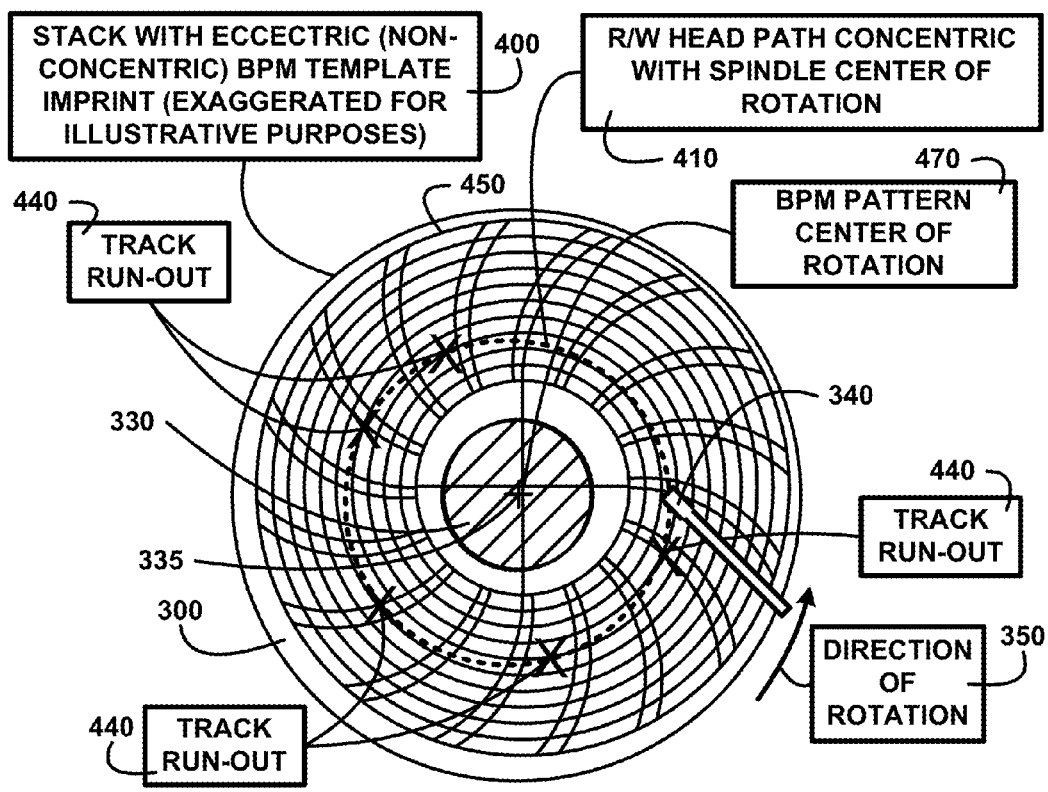
FIG. 4 shows for illustrative purposes only an example of eccentric BPM pattern imprint run-out of one embodiment.

FIG. 4 shows for illustrative purposes only an example of an eccentric BPM pattern imprint run-out of one embodiment. FIG. 4 shows a stack with eccentric (non-concentric) BPM template imprint (exaggerated for illustrative purposes) 400. The stack imprinting process has caused an eccentric BPM pattern imprint 450 which is common due to the nano scaled BPM pattern features. A BPM pattern center of rotation 470 is inherent in BPM patterns where the tracks 316 of FIG. 3A are concentric radial features. Where the BPM pattern center of rotation 470 is inherent in BPM patterns the spindle center of rotation 335 is inherent in the disc drive spindle 330.

The r/w head 340 is positioned in accordance with concentricity of the spindle center of rotation 335. The eccentric BPM pattern imprint 450 creates a misalignment of centers of rotation of the spindle and BPM pattern tracks 316 of FIG. 3A. When the disc drive spindle 330 imparts the direction of rotation 350 a r/w head path concentric with spindle center of rotation 410 is created. The r/w head 340 path is misaligned with the tracks 316 of FIG. 3A. This misalignment causes the r/w head path concentric with spindle center of rotation 410 to cross over back and forth with multiple tracks 316 of FIG. 3A. The crisscrossing of the tracks 316 of FIG. 3A is referred to as track run-out 440. Track run-out 440 can cause read and write errors of one embodiment.

FIG. 5A shows for illustrative purposes only an example of eccentric first wobble position of one embodiment. FIG. 5A shows the stack with eccentric (non-concentric) BPM template imprint (exaggerated for illustrative purposes) 400. The stack is shown without the servo fields 312 of FIG. 3A, data fields 314 of FIG. 3A and all but one of the tracks 316 of FIG. 3A to illustrate clearly the track run-out 440. FIG. 5A shows a BPM pattern zero degree rotational point A 510 used in this description as a clear reference point to trace the impact of the eccentric BPM pattern imprint 450. At this point in the disc drive spindle 330 direction of rotation 350 the r/w head 340 is in a head position within track 505 of an eccentric BPM pattern imprint track 500. A first BPM pattern eccentric wobble relative to spindle concentric center of rotation 520 is seen and the points of track run-out 440 rotating toward the r/w head 340 of one embodiment.

FIG. 5B shows for illustrative purposes only an example of eccentric second wobble position of one embodiment. FIG. 5B shows the stack with eccentric (non-concentric) BPM template imprint (exaggerated for illustrative purposes) 400. The direction of rotation 350 of the disc drive spindle 330 has rotated 60 degrees towards the r/w head 340. A BPM pattern 60 degree rotational point A 530 show the relative position of the eccentric BPM pattern imprint 450. The partial rotation has positioned the eccentric BPM pattern imprint track 500 under r/w head 340 in a track run-out 440 condition. The track run-out 440 condition shows a head position outside track 535. A second BPM pattern eccentric wobble relative to spindle concentric center of rotation 540 is an indicator of the misalignment of the rotation centers of one embodiment.

FIG. 5C shows for illustrative purposes only an example of eccentric third wobble position of one embodiment. FIG. 5C shows a BPM pattern 120 degree rotational point A 550 indicating the subsequent rotation from FIG. 5B. The stack with eccentric (non-concentric) BPM template imprint (exaggerated for illustrative purposes) 400 rotated by the disc drive spindle 330 in the direction of rotation 350 positioned the eccentric BPM pattern imprint 450 under the r/w head 340. The head position outside track 535 of the eccentric BPM pattern imprint track 500 shows track run-out 440. A third BPM pattern eccentric wobble relative to spindle concentric center of rotation 560 indicates the wobbling of the BPM pattern center of rotation 470 of FIG. 4 relative to the spindle center of rotation 335 of one embodiment.

Figure 6A:
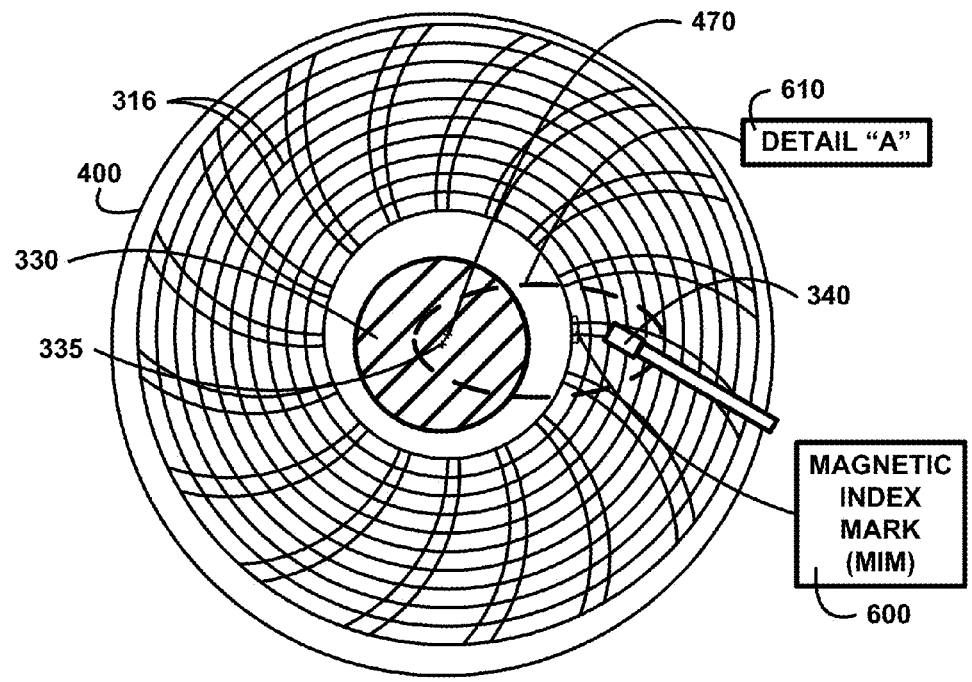
FIG. 6A shows for illustrative purposes only an example of a magnetic index mark (MIM) of one embodiment.

FIG. 6A shows for illustrative purposes only an example of a magnetic index mark (MIM) of one embodiment. FIG. 6A shows the stack with eccentric (non-concentric) BPM template imprint (exaggerated for illustrative purposes) 400. The tracks 316 determine the eccentric BPM pattern center of rotation 470. The disc drive spindle 330 determines the concentric spindle center of rotation 335. The positioning of the r/w head 340 over the tracks 316 determines whether track run-out 440 of FIG. 4 will occur. A magnetic index mark (MIM) 600 is added to the BPM pattern for imprinting to create a bias point offset as shown in detail "A" 610 of one embodiment.

Figure 6B:
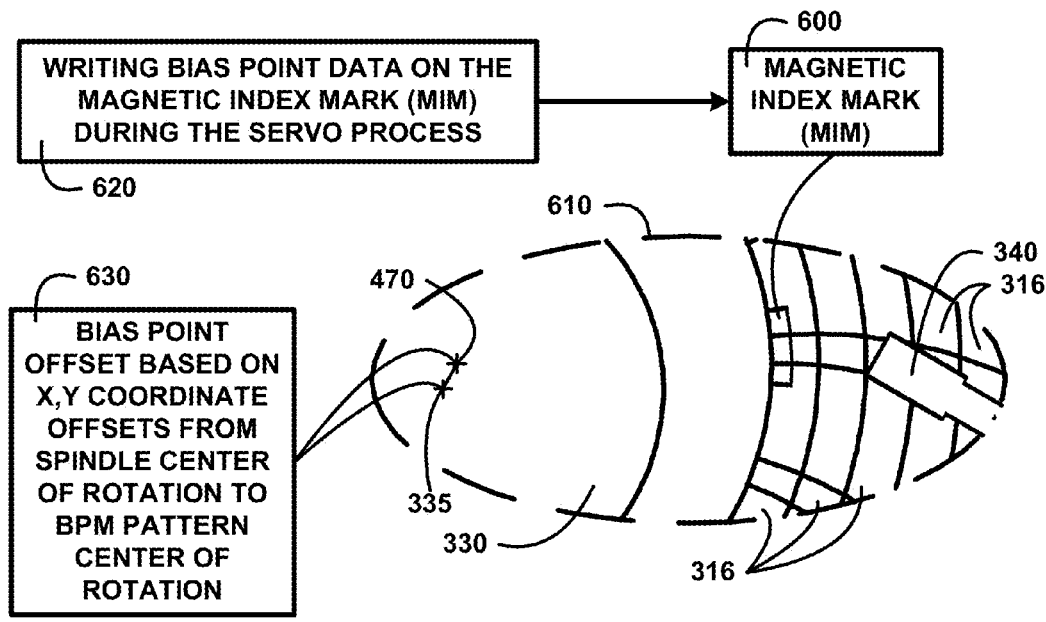
FIG. 6B shows for illustrative purposes only an example of a MIM bias point offset of one embodiment.

FIG. 6B shows for illustrative purposes only an example of a MIM bias point offset of one embodiment. FIG. 6B shows detail "A" 610 including the tracks 316, disc drive spindle 330 and r/w head 340. The magnetic index mark (MIM) 600 is an integrated part of the BPM pattern imprint. The magnetic index mark (MIM) 600 is integrated close to the 0° zero point of the first sector where servo writing is done. Adding the magnetic index mark (MIM) 600 to the BPM pattern master automatically transfer the MIM to any stacks fabricated using the BPM pattern master templates so it is inherently part of the process with no additional processing steps. This establishes the MIM and bias of the stack disc creating an index mark or bias point uniformly on the fabricated stacks. The magnetic index mark (MIM) 600 can be used as a reference point where you want to push or minimize the clearance of the with respect to the spindle clamp when mounting the stack disc. There are 360 degrees of rotation and typically there are 400-500 servo sectors within the BPM pattern. The MIM is larger than any one sector and therefore larger than a degree of rotation of one embodiment.

A bias point offset based on x,y coordinate offsets from spindle center of rotation to BPM pattern center of rotation 630 is created using the relative locations of the spindle center of rotation 335 and BPM pattern center of rotation 470. The bias point offset coordinate data and other MIM identification information is written on the MIM section of the stack. The MIM information is recorded on the imprinted stack by writing bias point data on the magnetic index mark (MIM) during a servo writing process 620. Integrating the MIM into the BPM pattern, imprint process and servo writing process saves any additional processing steps to create an indexing mark of one embodiment.

Figure 7:
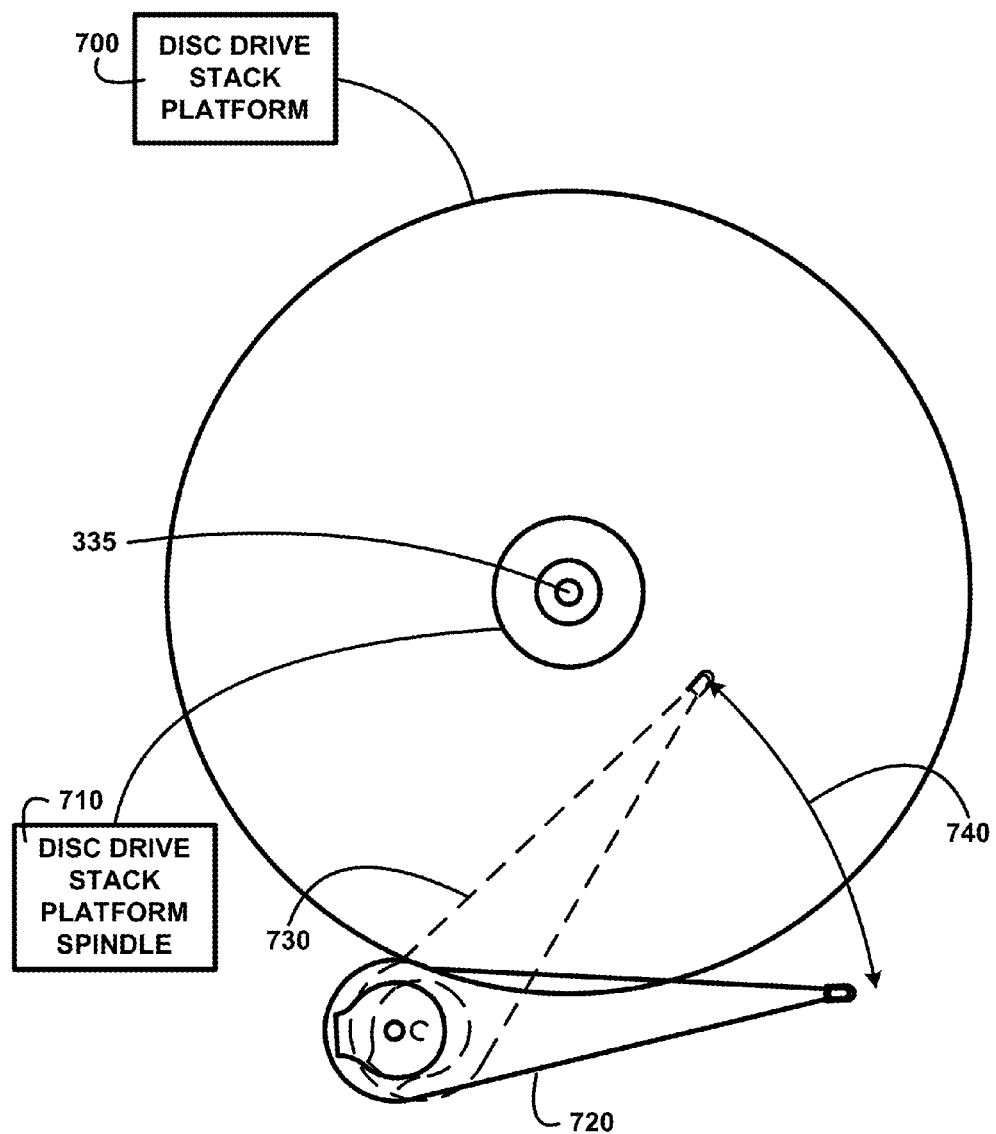
FIG. 7 shows for illustrative purposes only an example of typical arc movement of the r/w head of one embodiment.

FIG. 7 shows for illustrative purposes only an example of typical arc movement of the r/w head of one embodiment. FIG. 7 shows a disc drive stack platform 700 and a disc drive stack platform spindle 710. The disc drive stack platform spindle 710 has the spindle center of rotation 335. A pivoting r/w head and arm assembly 720 is used to position the r/w head 340 of FIG. 3B over the tracks of a BPM stack. FIG. 7 shows a pivoted r/w head and arm assembly position 730 and a typical arc movement of the r/w head 740 to access the magnetic recording area of the stack of one embodiment.

Figure 8:
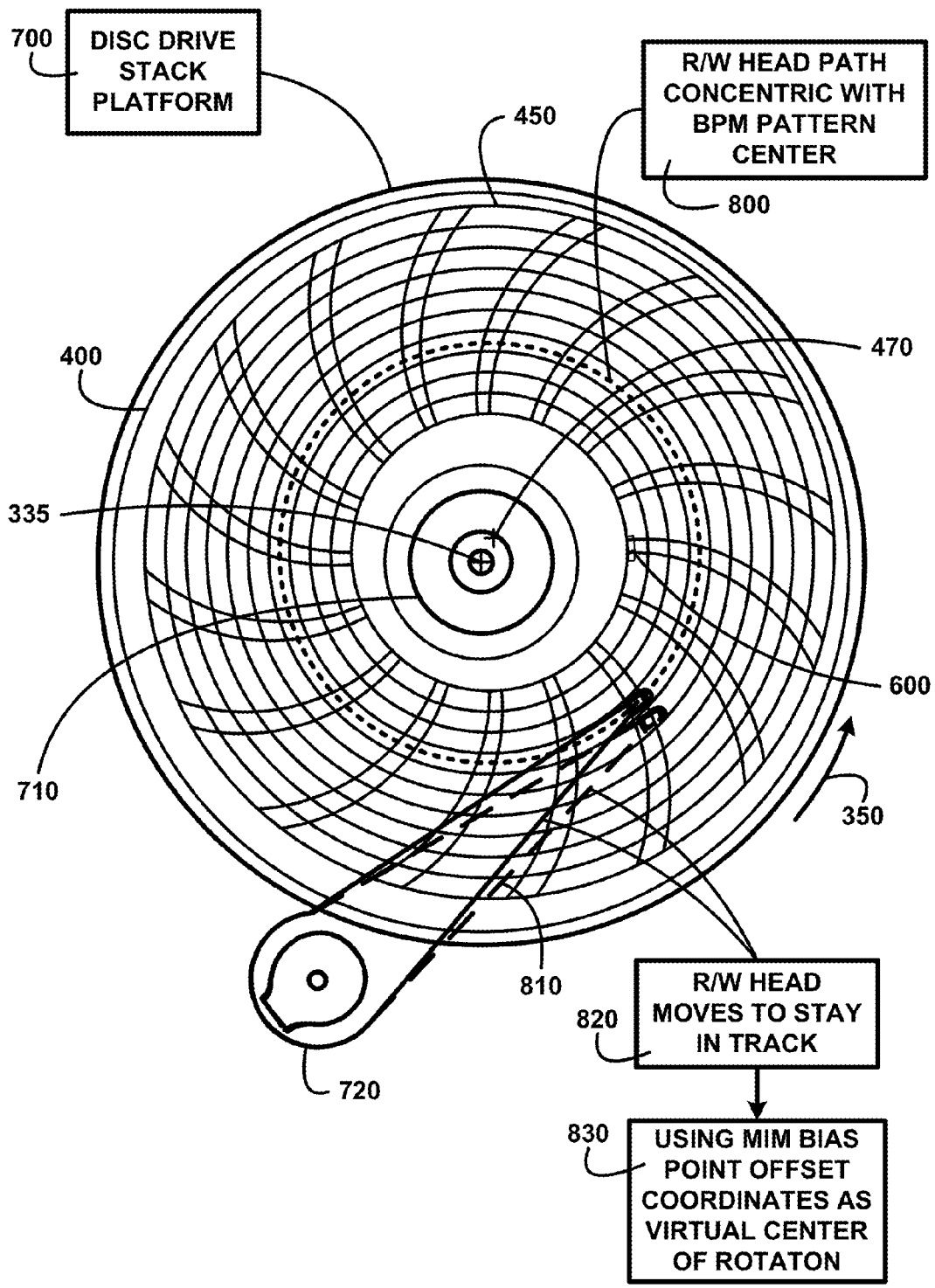
FIG. 8 shows for illustrative purposes only an example of using MIM bias point offset coordinates as virtual center of rotation of one embodiment.

FIG. 8 shows for illustrative purposes only an example of using MIM bias point offset coordinates as virtual center of rotation of one embodiment. FIG. 8 shows the disc drive stack platform 700 with the stack with eccentric (non-concentric) BPM template imprint (exaggerated for illustrative purposes) 400 mounted thereon. The stack includes the eccentric BPM pattern imprint 450 and shows the BPM pattern center of rotation 470. The magnetic index mark (MIM) 600 is located in the servo area of the eccentric BPM pattern imprint 450 of one embodiment.

The disc drive stack platform spindle 710 shows the spindle center of rotation 335. The pivoting r/w head and arm assembly 720 is positioned over the BPM pattern track. The pivoting r/w head and arm assembly 720 is in a r/w head path concentric with BPM pattern center 800. The disc drive uses the magnetic index mark (MIM) 600 data for r/w head MIM bias point offset eccentric adjustment positioning 810. The r/w head MIM bias point offset eccentric adjustment positioning 810 makes the nano scaled adjustments of the pivoting r/w head and arm assembly 720 position of one embodiment.

A r/w head moves to stay in track 820 using MIM bias point offset coordinates as virtual center of rotation 830 that were recorded in the magnetic index mark (MIM) 600. The magnetic index mark (MIM) 600 enables the disc drive to compensate for any eccentric positioning of the BPM pattern imprint. The r/w head MIM bias point offset eccentric adjustment positioning 810 prevents track run-out 440 of FIG. 4 and eliminates read and write errors otherwise caused by the eccentric misalignment of centers of rotation of one embodiment.

Figure 9A:
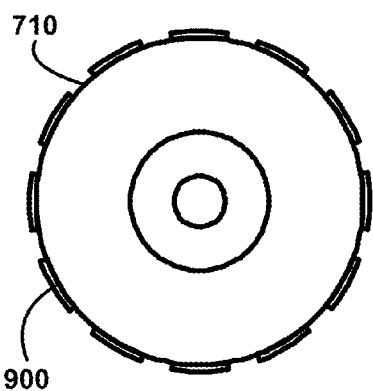
FIG. 9A shows for illustrative purposes only an example of positioning spindle clamps of one embodiment.

FIG. 9A shows for illustrative purposes only an example of positioning spindle clamps of one embodiment. FIG. 9A shows the disc drive stack platform spindle 710. The disc drive stack platform spindle 710 in this example includes spindle clamps 900. The spindle clamps 900 are used for securely mounting a stack in the disc drive of one embodiment.

Figure 9B:
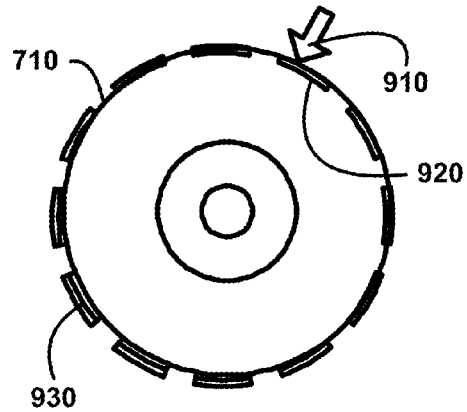
FIG. 9B shows for illustrative purposes only an example of a pushed in position of spindle clamps of one embodiment.

FIG. 9B shows for illustrative purposes only an example of pushed in position of spindle clamps of one embodiment. FIG. 9B shows the disc drive stack platform spindle 710 with spindle clamps 900 of FIG. 9A. In this example the spindle clamps 900 of FIG. 9A are shown after pushing against the spindle clamps 910 when a stack is being mounted. The pushed-in position of spindle clamps 920 where the pushing occurred in tandem causes a pushed-out position of spindle clamps 930 on other spindle clamps 900 of FIG. 9A. The pushing adjustment of the spindle clamps 900 of FIG. 9A position enables the stack to be mounted in a concentric location of one embodiment.

Figure 9C:
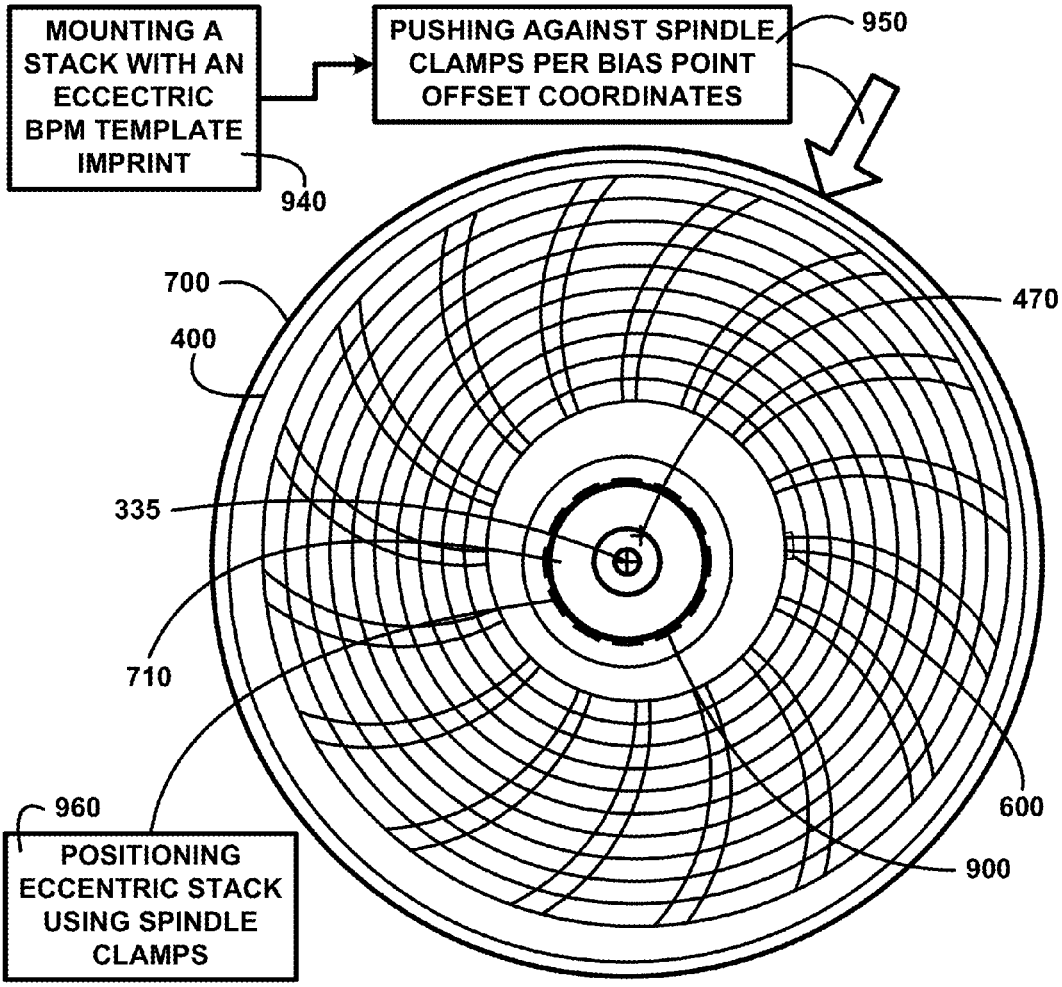
FIG. 9C shows for illustrative purposes only an example of pushing spindle clamps using MIM bias point offset of one embodiment.

FIG. 9C shows for illustrative purposes only an example of pushing spindle clamps using MIM bias point offset of one embodiment. FIG. 9C shows the disc drive stack platform 700 and disc drive stack platform spindle 710. The disc drive stack platform spindle 710 in this example includes spindle clamps 900. The spindle clamps 900 are used for securely mounting the stack with eccentric (non-concentric) BPM template imprint (exaggerated for illustrative purposes) 400. The spindle clamps 900 can move laterally when positioning a stack onto the disc drive stack platform spindle 710. The lateral movement of the spindle clamps 900 can be used to push the stack when being mounted to minimize the positioning clearances of the stack with respect to the disc drive stack platform spindle 710 of one embodiment.

The magnetic index mark (MIM) 600 integrated into the BPM pattern includes the bias point offset coordinates recorded during the servo writing process. The magnetic index mark (MIM) 600 bias point offset coordinates can include the direction and distance from the BPM pattern center of rotation 470 of FIG. 4 to the spindle center of rotation 335 from the magnetic index mark (MIM) 600 using the MIM as a point of reference of one embodiment.

The disc drive can include a device to reposition a stack to be mounted wherein the stack can be pushed against the spindle clamps 900 to a position which is concentric with the spindle center of rotation 335. When mounting a stack with an eccentric BPM template imprint 940 a repositioning device is used for pushing against spindle clamps per bias point offset coordinates 950. Once the spindle clamps 900 have been repositioned the clamps lock into position and securely hold the stack with an eccentric BPM pattern imprint 450 of FIG. 4. Concentricity between the BPM pattern center of rotation 470 and the spindle center of rotation 335 is created by repositioning the BPM pattern center of rotation 470 using the positioning eccentric stack using spindle clamps 960 process. The magnetic index mark (MIM) 600 enables the mounting repositioning to create concentricity. The stack mounting is repositioned using the two sided magnetic index mark bias point offset to control the positioning of the read/write head prevents run-out 150 of FIG. 1 of one embodiment.

The foregoing has described the principles, embodiments and modes of operation. However, the invention should not be construed as being limited to the particular embodiments discussed. The above described embodiments should be regarded as illustrative rather than restrictive, and it should be appreciated that variations may be made in those embodiments by workers skilled in the art without departing from the scope as defined by the following claims.

What is claimed is:

1. A method, comprising:
   creating a marking structure including a magnetic index mark and an orientation control bias point;
   determining an offset based on the orientation control bias point on specific coordinates used to substantially prevent concentricity run-out; and
   establishing a magnetically writable area within the orientation control bias point.

2. The method of claim 1, further comprising integrating close to a 0° zero point of a first sector where servo writing is done, and wherein the magnetic index mark is integrated and created on two sides of a bit patterned media (BPM) stack pattern for master imprint templates.

3. The method of claim 1, wherein the magnetic index mark includes being larger than any one sector and therefore larger than a degree of rotation.

4. The method of claim 1, wherein the specific coordinates include x,y coordinate offsets from a spindle center of rotation to a bit patterned media pattern center of rotation uniformly on fabricated bit patterned media stacks, and wherein these are used to establish the center of rotation of the bit patterned media pattern and servo signal to prevent run-out.

5. The method of claim 1, further comprising using a writable section of the magnetic index mark to record identification information, orientation control bias point offset coordinate data, and other magnetic index mark information during a servo writing process.

6. The method of claim 1, further comprising determining an orientation control bias point offset coordinate value based on x,y coordinate offsets from an eccentric bit patterned media pattern center of rotation relative to a spindle center of rotation.

7. The method of claim 1, further comprising aligning bit patterned media master imprint templates concentrically and matching aligned magnetic index marks thereon for imprinting processes.

8. The method of claim 1, further comprising using the orientation control bias point and magnetic index mark for controlling positioning of a read-write head to maintain a position within tracks of a bit patterned media pattern to prevent track run-out.

9. The method of claim 1, further comprising using the orientation control bias point for controlling positioning movements of a read-write head to maintain a position within an eccentric track using the magnetic index mark to prevent track run-out.

10. The method of claim 1, further comprising using the orientation control bias point for repositioning a stack mounting on a spindle to create concentricity of centers of rotation for an imprinted bit patterned media pattern and a disc drive spindle to position a read-write head within an eccentric track of an eccentric bit patterned media pattern to prevent track run-out.

11. An apparatus, comprising:
    a magnetic index mark including an orientation control bias point integrated on two sides of a bit patterned media pattern configured to be used to make master imprint templates;
    an orientation control bias point offset coordinate value configured to determine a center of rotation of the bit patterned media pattern; and
    a set of coordinates configured to align bit patterned media master imprint templates concentrically and match aligned magnetic index marks for imprinting processes.

12. The apparatus of claim 11, further comprising a position controller configured to control positioning movements of a read-write head configured to maintain a position within an eccentric track using the magnetic index mark to prevent track run-out.

13. The apparatus of claim 11, further comprising a repositioner configured to reposition a stack mounting on a spindle configured to be used to create concentricity of centers of rotation for an imprinted bit patterned media pattern and a disc drive spindle to position a read-write head within an eccentric track of an eccentric bit patterned media pattern.

14. The apparatus of claim 11, further comprising a data recorder configured to record orientation control bias point offset coordinate value data, magnetic index mark identification information, and other magnetic index mark information in a writable section of the magnetic index mark.

15. The apparatus of claim 11, further comprising an offset value determiner configured to determine the orientation control bias point offset coordinate value based on x,y coordinate offsets from an eccentric bit patterned media pattern center of rotation relative to a spindle center of rotation.

16. A marking structure, comprising:
    an orientation control bias point coupled to a magnetic index mark and having a bias point offset set at predetermined coordinates configured to substantially prevent concentricity run-out, wherein the magnetic index mark is configured to be integrated close to a 0° zero point of a first sector where servo writing is done and the magnetic index mark is larger than any one sector and therefore larger than a degree of rotation.

17. The marking structure of claim 16, wherein the magnetic index mark is configured to establish the orientation control bias point of a bit patterned media pattern to create the bias point offset based on x,y coordinate offsets from a spindle center of rotation to a bit patterned media pattern center of rotation uniformly on fabricated bit patterned media stacks.

18. The marking structure of claim 16, wherein magnetic index mark identification information, orientation control bias point offset coordinate data,. and other magnetic index mark information is written in a magnetically writable area located within the orientation control bias point within a magnetic index mark section of a stack during a servo writing process.

19. The marking structure of claim 16, wherein the magnetic index mark is configured to be used to adjust read/write head positioning and disc drive spindle mounting repositioning to create concentricity of the read/write head with bit patterned media tracks to prevent track run-out and eliminate read and write errors caused by eccentric misalignment of centers of rotation.

* * * * *